US012633093B2

(12) United States Patent
    Taminato

(10) Patent No.: US 12,633,093 B2
(45) Date of Patent: May 19, 2026

(54) INFORMATION PROCESSING APPARATUS, INFORMATION PROCESSING METHOD, AND STORAGE MEDIUM FOR RECOGNIZING TASKS

(71) Applicant: CANON KABUSHIKI KAISHA, Tokyo (JP)

(72) Inventor: Tomoki Taminato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 482 days.

(21) Appl. No.: 18/179,443

(22) Filed: Mar. 7, 2023

(65) Prior Publication Data

US 2023/0298329 A1     Sep. 21, 2023

(30) Foreign Application Priority Data

Mar. 16, 2022    (JP) ................................. 2022-041759
Feb. 28, 2023    (JP) ................................. 2023-030135

(51) Int. Cl.
    *G06V 10/776*        (2022.01)
    *G06V 10/778*        (2022.01)
(52) U.S. Cl.
    CPC ........ *G06V 10/776* (2022.01); *G06V 10/7788* (2022.01)
(58) Field of Classification Search
    None
    See application file for complete search history.

(56) References Cited

U.S. PATENT DOCUMENTS

| | | | | |
|---|---|---|---|---|
| 9,916,538 B2 * | 3/2018 | Zadeh | ...................... | A61B 5/165 |
| 10,783,394 B2 * | 9/2020 | Molchanov | ............ | G06N 3/088 |
| 2018/0053056 A1 * | 2/2018 | Rabinovich | .......... | G06V 10/764 |
| 2019/0318755 A1 * | 10/2019 | Tashev | ................... | G06N 3/045 |
| 2020/0027275 A1 * | 1/2020 | Wan | ......................... | G06V 20/20 |
| 2020/0160836 A1 * | 5/2020 | Chen | ...................... | G10L 15/005 |
| 2021/0374502 A1 * | 12/2021 | Roth | ........................ | G06N 3/08 |
| 2022/0284294 A1 * | 9/2022 | Keller | ................... | G06F 18/214 |
| 2023/0222672 A1 * | 7/2023 | Taminato | .................. | G06T 3/40 |
| | | | | 382/103 |
| 2023/0316756 A1 * | 10/2023 | Wang | ..................... | G06V 20/35 |
| | | | | 382/128 |

OTHER PUBLICATIONS

Hamad et al., "Joint Learning of Temporal Models to Handle Imbalanced Data for Human Activity Recognition," Appl. Sci. 2020, 10, 5293; doi:10.3390/app10/155293 (Year: 2020).*
Dean, J. et al., "Large Scale Distributed Deep Networks" NIPS (Dec. 2012) pp. 1223-1231.
Mnih, V. et al., "Human-level control through deep reinforcement learning" Nature (Feb. 2015) pp. 529-533, vol. 518.

* cited by examiner

*Primary Examiner* — Soo Shin
(74) *Attorney, Agent, or Firm* — Carter, DeLuca & Farrell LLP

(57)                ABSTRACT

There is provided with an information processing apparatus. A first updating unit updates a weight using corresponding learning data, with respect to each of a plurality of recognition models. An evaluating unit evaluates recognition accuracy with respect to each of the recognition models. A first setting unit sets parameters for integrating weights corresponding to a shared layer of the recognition models based on results of evaluation of the recognition accuracy. An integrating unit integrates the weights corresponding to the shared layer based on the parameters.

21 Claims, 8 Drawing Sheets

F I G. 2
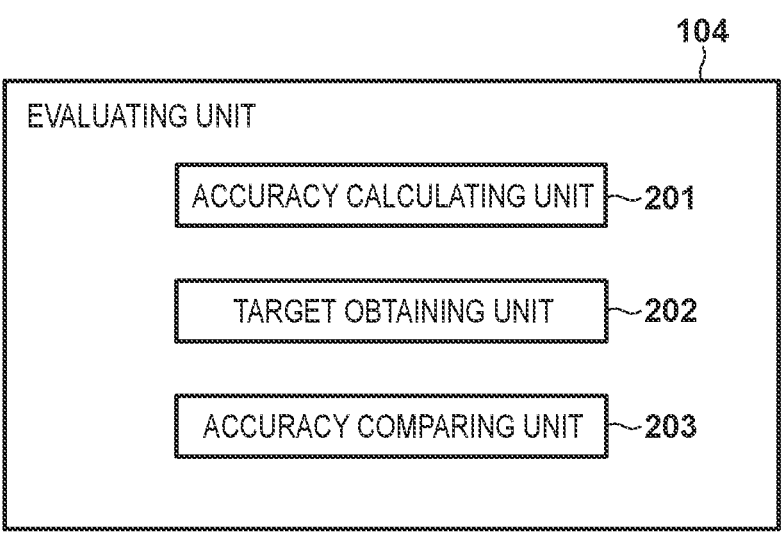
104
EVALUATING UNIT
ACCURACY CALCULATING UNIT — 201
TARGET OBTAINING UNIT — 202
ACCURACY COMPARING UNIT — 203
F I G. 3
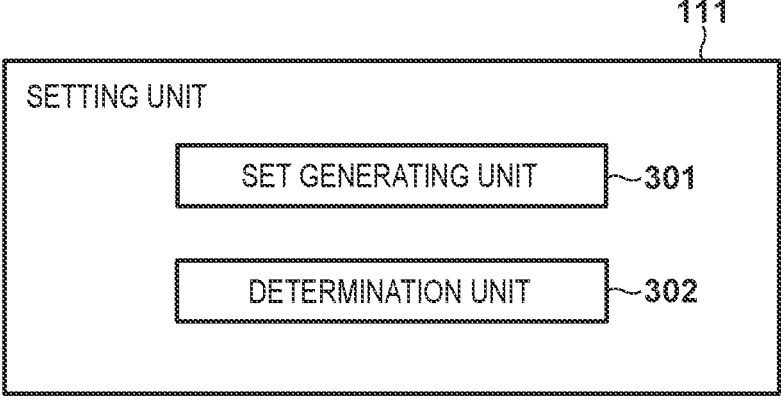
111
SETTING UNIT
SET GENERATING UNIT — 301
DETERMINATION UNIT — 302

6

| Δ ( = ACCURACY - TARGET ACCURACY) | RECOGNITION MODEL A | RECOGNITION MODEL B |
|---|---|---|
| Δ > 0 | 0.95 | 0.9 |
| Δ < -3 | 1.2 | 1.1 |
| Δ < -10 | 1.5 | 1.3 |
| Δ < -20 | 2.0 | 1.5 |
| Δ < -50 | 0.95 | 1.0 |

F I G. 7
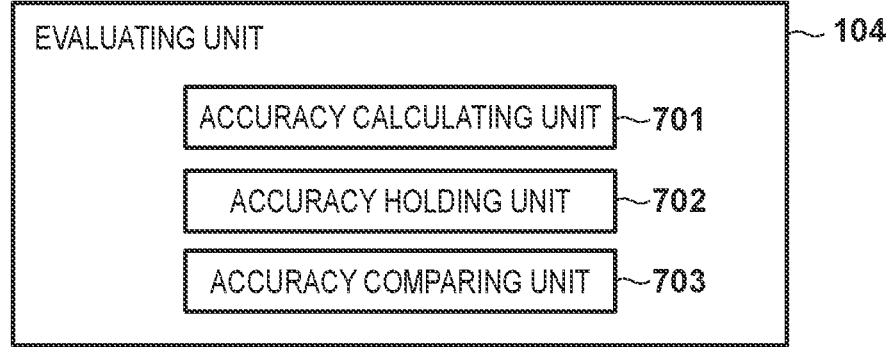
F I G. 8
| Δ ( = ACCURACY - TARGET ACCURACY) | RECOGNITION MODEL A | RECOGNITION MODEL B | ~ 8 |
|---|---|---|---|
| Δ > 0 | 1 | 1 | |
| Δ < -3 | 2 | 2 | |
| Δ < -10 | 5 | 10 | |
| Δ < -20 | 25 | 15 | |
| Δ < -50 | 50 | 100 | |
F I G. 9
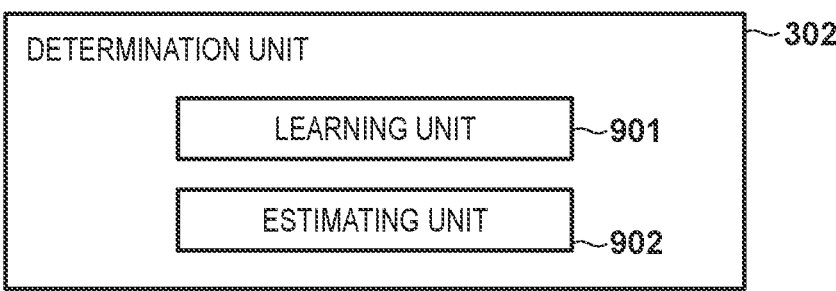
F I G. 10
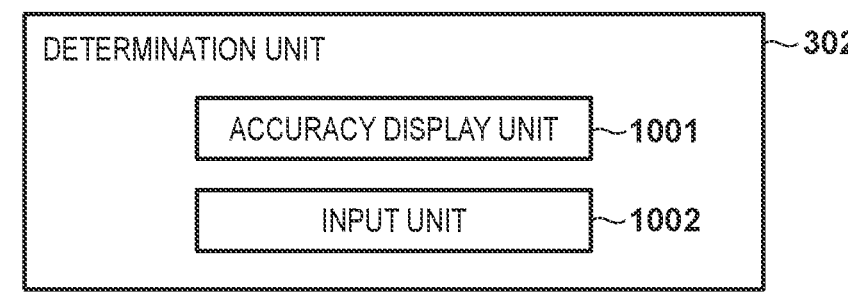

F I G. 12
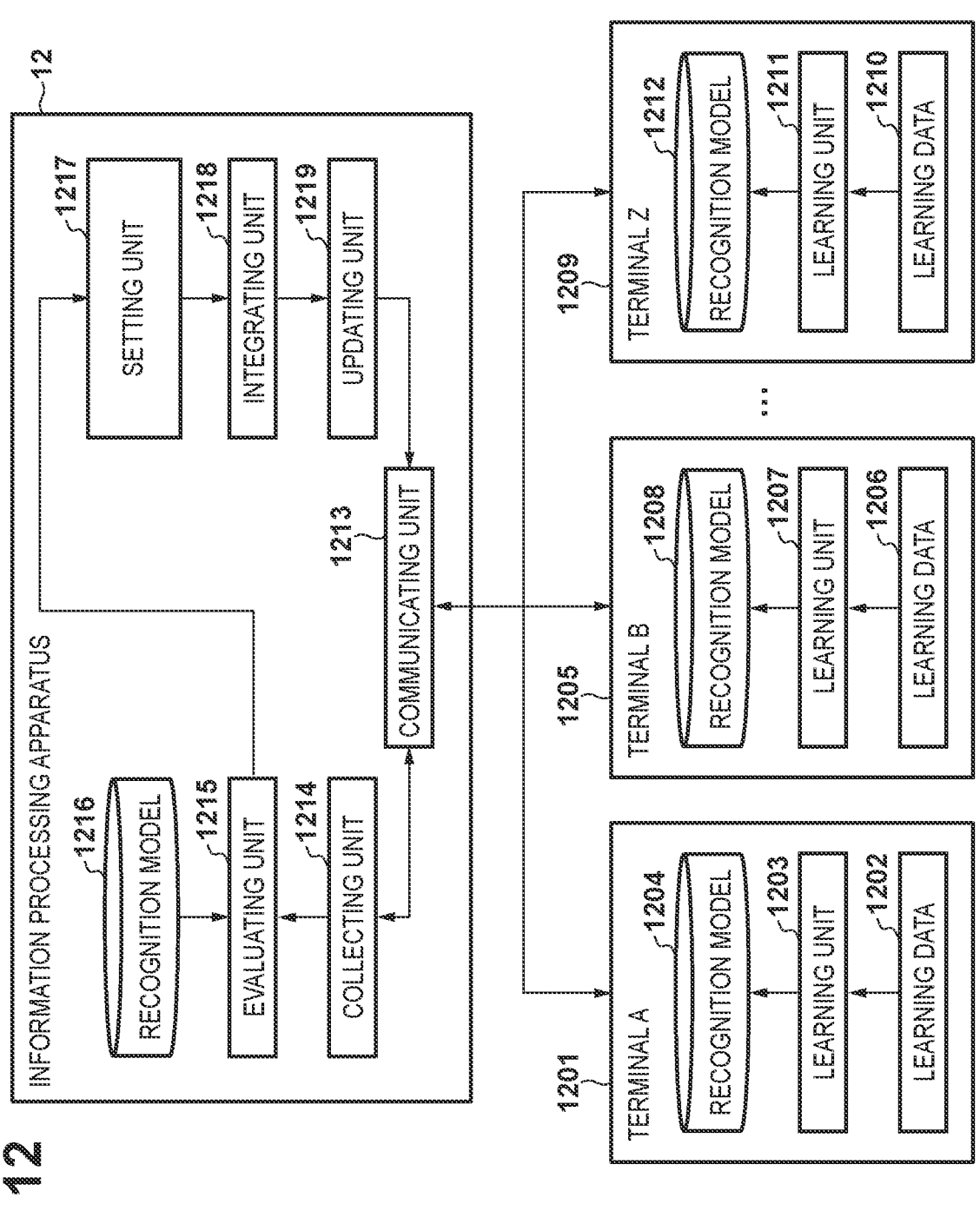

F I G.  13
1301             1302             1303
| PROCESSOR | MEMORY | STORAGE MEDIUM |
|---|---|---|
1306
1304             1305
| INPUT INTERFACE | OUTPUT INTERFACE |
|---|---|
F I G.  14
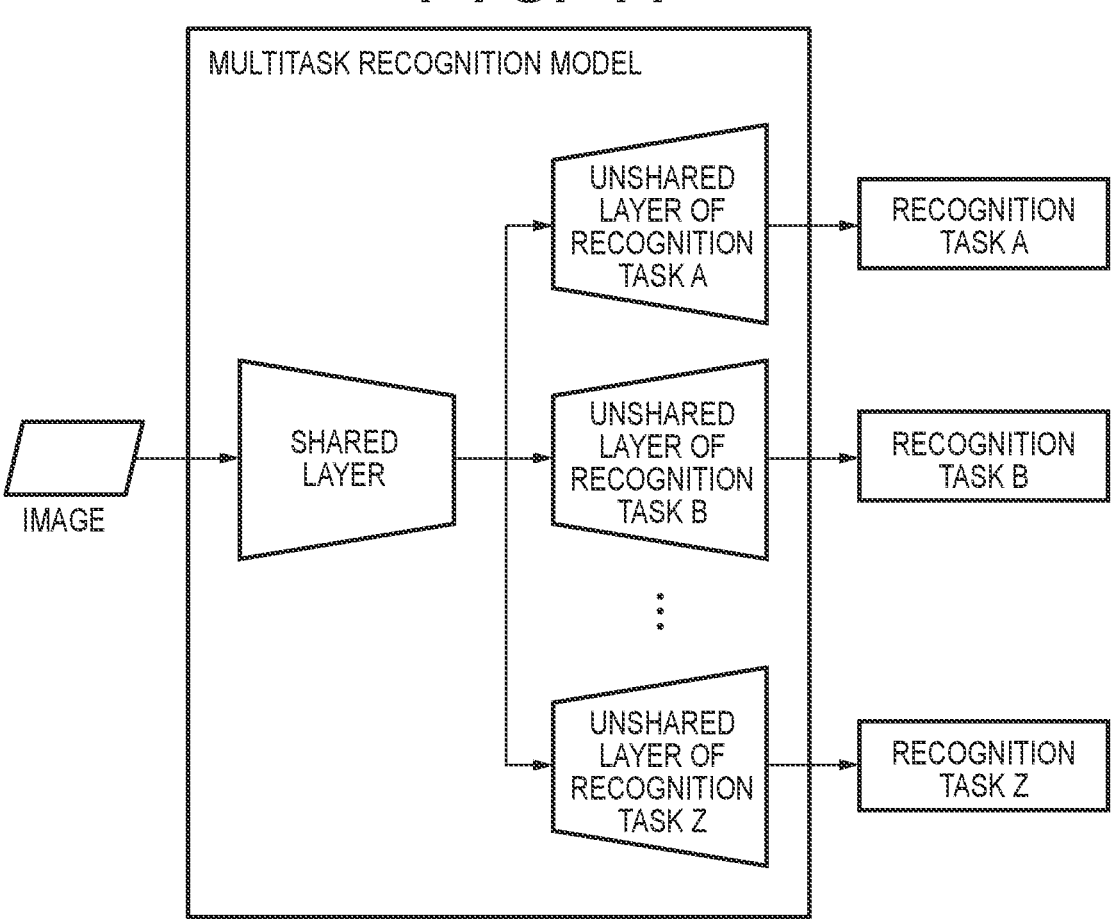
MULTITASK RECOGNITION MODEL
IMAGE → SHARED LAYER → UNSHARED LAYER OF RECOGNITION TASK A → RECOGNITION TASK A
UNSHARED LAYER OF RECOGNITION TASK B → RECOGNITION TASK B
UNSHARED LAYER OF RECOGNITION TASK Z → RECOGNITION TASK Z

INFORMATION PROCESSING APPARATUS, INFORMATION PROCESSING METHOD, AND STORAGE MEDIUM FOR RECOGNIZING TASKS

BACKGROUND OF THE INVENTION

Field of the Invention

The present invention relates to an information processing apparatus, an information processing method, and a storage medium.

Description of the Related Art

There are technologies with which a machine such as a computer learn and recognize contents of data such as an image or audio. Neural networks (hereinafter referred to as NNs) are known as technologies for learning and executing such recognition processing, and multilayered NNs including a large number of layers are also called deep NNs (DNNs).

As a method for efficiently carrying out learning of a multilayered NN, there is a method that uses distributed learning in which deep learning is performed in a distributed manner using a plurality of computation nodes that are connected to each other via a communication network (see for example, Jeffrey Dean, et al., "Large Scale Distributed Deep Networks", NIPS 2012 (4687), 1223-1231).

SUMMARY OF THE INVENTION

According to one embodiment of the present invention, an information processing apparatus comprising: a first updating unit configured to update a weight using corresponding learning data, with respect to each of a plurality of recognition models; an evaluating unit configured to evaluate recognition accuracy with respect to each of the recognition models; a first setting unit configured to set parameters for integrating weights corresponding to a shared layer of the recognition models based on results of evaluation of the recognition accuracy; and an integrating unit configured to integrate the weights corresponding to the shared layer based on the parameters.

According to another embodiment of the present invention, an information processing method comprising: updating a weight using corresponding learning data, with respect to each of a plurality of recognition models; evaluating recognition accuracy with respect to each of the recognition models; setting parameters for integrating weights corresponding to a shared layer of the recognition models based on results of evaluation of the recognition accuracy; and integrating the weights corresponding to the shared layer based on the parameters.

According to yet another embodiment of the present invention, a non-transitory computer readable storage medium storing a program that, when executed by a computer, causes the computer to perform an information processing method comprising: updating a weight using corresponding learning data, with respect to each of a plurality of recognition models; evaluating recognition accuracy with respect to each of the recognition models; setting parameters for integrating weights corresponding to a shared layer of the recognition models based on results of evaluation of the recognition accuracy; and integrating the weights corresponding to the shared layer based on the parameters.

Further features of the present invention will become apparent from the following description of exemplary embodiments (with reference to the attached drawings).

BRIEF DESCRIPTION OF THE DRAWINGS

FIG. 2 is a block diagram showing an example of a detailed functional configuration of an evaluating unit according to the first embodiment.

FIG. 3 is a block diagram showing an example of a detailed functional configuration of a setting unit according to the first embodiment.

FIG. 7 is a block diagram showing an example of a detailed functional configuration of the evaluating unit according to an application example of the first embodiment.

FIG. 8 is a table showing an example of parameters determined in accordance with evaluation results of recognition accuracy according to the first embodiment.

FIG. 9 is a block diagram showing an example of a detailed functional configuration of a determination unit according to an application example of the first embodiment.

FIG. 10 is a block diagram showing an example of a detailed functional configuration of the determination unit according to an application example of the first embodiment.

FIG. 12 is a block diagram showing an example of a functional configuration of an information processing apparatus according to a second embodiment.

FIG. 13 is a block diagram showing an example of a hardware configuration according to a third embodiment.

FIG. 14 is a diagram showing a multitask recognition model that carries out distributed learning.

DESCRIPTION OF THE EMBODIMENTS

Figure 1:
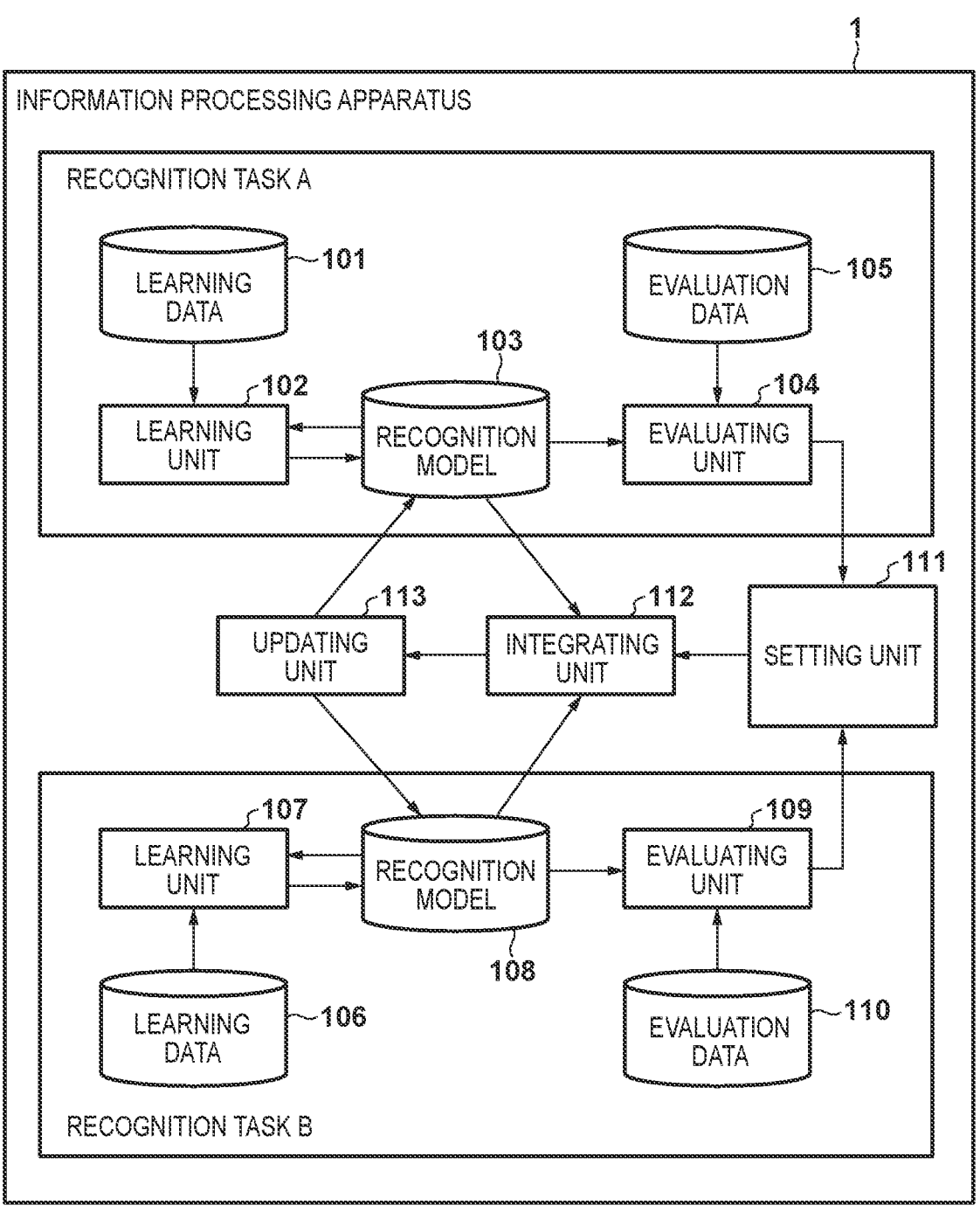
FIG. 1 is a block diagram showing an example of a functional configuration of an information processing apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In a learning model that has a weight shared by a plurality of recognition models as is the case of distributed learning, for example, it is difficult to appropriately set a method for integrating weights of the shared part. Even in the case where weights of a shared layer (shared layer) of the recognition models are integrated by carrying out distributed learning of a single task, the rate of progress of the learning commonly differs between computation nodes, and therefore, the recognition accuracy may be degraded if the weights are integrated by averaging a weight of a model for which learning has sufficiently progressed and a weight of a model for which learning has not sufficiently progressed.

Embodiments of the present invention provide an information processing apparatus that integrates weights corresponding to a shared part of a plurality of recognition models in such a manner that identification accuracy of recognition tasks integrated through distributed learning improves as far as possible.

First Embodiment

In a first embodiment, distributed learning is carried out in which a plurality of mathematical models (recognition models) that learn and execute objects (recognition tasks) of recognition processing have a shared part in which some weights are shared by the models, and the models are integrated by sharing the shared part while learning the weights separately from each other. Such distributed learning is possible because the recognition models have a shared layer (the "shared part" and the "shared layer" have the same meaning as the "shared layer"). In the following description, the plurality of recognition models for which learning is carried out by an information processing apparatus according to the present embodiment will be referred to as "recognition models A to C", and corresponding recognition tasks will be referred to as "recognition tasks A to C", but the numbers and types of recognition models and recognition tasks are not limited to these examples. Targets to be recognized in the recognition tasks may be different from each other, but a configuration is also possible in which some of the recognition tasks have the same recognition target.

The information processing apparatus 1 according to the present embodiment updates a weight by using corresponding learning data, with respect to each of the plurality of recognition models, and evaluates recognition accuracy of each recognition model. Then, the information processing apparatus 1 sets parameters for integrating weights corresponding to the shared part of the recognition models based on evaluation results of the recognition accuracy, and integrates the plurality of recognition models in such a manner that the recognition models share the shared part, by integrating the weights corresponding to the shared part based on the set parameters. When the term "recognition accuracy" is used alone in the following description, the term refers to the accuracy of recognition of a recognition target by a recognition model.

FIG. 14 is a schematic diagram showing processing performed by the information processing apparatus 1 according to the present embodiment, which is a multitask recognition model that carries out distributed learning using a plurality of recognition models. The multitask recognition model illustrated in this diagram includes the recognition models A to C that perform processing in unshared layers A to C respectively corresponding to the recognition tasks A to C after an image input to the information processing apparatus 1 is processed in the shared layer. An example of distributed learning processing for integrating weights corresponding to the shared layer of the respective recognition models will be described later with reference to FIGS. 3 to 5.

FIG. 1 is a block diagram showing an example of a functional configuration of the information processing apparatus 1 according to the present embodiment. The information processing apparatus 1 carries out distributed learning using the recognition model A corresponding to the recognition task A and the recognition model B corresponding to the recognition task B. The information processing apparatus 1 includes a learning unit 102, a recognition model 103, and an evaluating unit 104, which correspond to the recognition model A, and a learning unit 107, a recognition model 108, and an evaluating unit 109, which correspond to the recognition model B. The information processing apparatus 1 also includes a setting unit 111, an integrating unit 112, and an updating unit 113.

There is no particular limitation on recognition targets to be recognized in the recognition tasks in the present embodiment. In the following description, the recognition task A will be described as a human detection task for detecting human beings, and the recognition task B will be described as a road region dividing task for dividing and recognizing road regions, but the recognition tasks A and B may also be the same task as described above. Such a multitask recognition model that learns different tasks can be used to reduce the number of accidents of contact with human beings in an automated driving system of automobiles, for example. Here, the two recognition models A and B are illustrated for the sake of convenience of description, but the information processing apparatus 1 may also carry out learning with respect to three or more recognition tasks and integrate those recognition tasks.

The learning unit 102 carries out learning of the recognition model 103 using learning data 101 for learning the recognition task A (human detection). The recognition models described below including the recognition models A and B are constituted by multilayered neural networks (NNs), and output recognition results of recognition targets with respect to an input such as an image or feature values. Learning of multilayered NNs for recognizing recognition targets can be carried out using known technologies, and a detailed description thereof will be omitted.

The evaluating unit 104 evaluates the recognition accuracy of the recognition model 103 using evaluation data 105. The evaluation data 105 includes image data for carrying out the recognition task and correct answer data corresponding to the image data. The evaluating unit 104 can evaluate the recognition accuracy by comparing a result of recognition by the recognition model 103 with correct answer data included in the evaluation data 105. The evaluating unit 104 according to the present embodiment evaluates the recognition accuracy at predetermined intervals and transmits the evaluation result to the setting unit 111. The predetermined intervals at which the evaluating unit 104 performs evaluation can be set suitably, and, in this example, are set using the number of repetitions of learning or a learning time.

The learning unit 107, the recognition model 108, and the evaluating unit 109 can perform processing similarly to the learning unit 102, the recognition model 103, and the evaluating unit 104, other than that these units perform the processing for a different recognition task, and therefore, overlapping descriptions will be omitted.

The following describes evaluation processing performed by the evaluating unit 104 (or the evaluating unit 109) with reference to FIG. 2. FIG. 2 is a block diagram showing an example of a detailed functional configuration of the evaluating unit 104 according to the present embodiment. The evaluating unit 104 includes an accuracy calculating unit 201, a target obtaining unit 202, and an accuracy comparing unit 203.

The accuracy calculating unit 201 compares an output result of the recognition task executed when image data included in the evaluation data 105 is input to the recognition model 103, with correct answer data included in the evaluation data 105, and calculates recognition accuracy of the output result. As the recognition accuracy according to the present embodiment, it is possible to use any suitable measure that indicates the accuracy of recognition processing and is comparable, such as the value of a loss function, accuracy, recall, or precision of a detected region relative to the evaluation data. The following describes a case where the accuracy of a detected region is used as the recognition accuracy.

The target obtaining unit 202 obtains target accuracy with respect to the accuracy calculated by the accuracy calculating unit 201. Here, the target accuracy is a target value of the recognition accuracy required for the recognition model in executing the recognition task, and a user can set the target accuracy to a desired value in advance.

The accuracy comparing unit 203 evaluates the recognition accuracy of the recognition model 103 by comparing the recognition accuracy calculated by the accuracy calculating unit 201 with the target accuracy obtained by the target obtaining unit 202. The accuracy comparing unit 203 according to the present embodiment outputs a difference between the value of the recognition accuracy and the value of the target accuracy as an evaluation result (evaluation value A) of the recognition accuracy, but the evaluation value may be output in any form so long as the value of the recognition accuracy can be evaluated relative to the target accuracy. For example, the accuracy comparing unit 203 may also output the ratio (recognition accuracy/target accuracy) of the recognition accuracy to the target accuracy as the evaluation value.

The evaluation data 110 of the recognition task B is configured essentially in the same manner as the evaluation data 105, except for the difference in the recognition target. As described above, the recognition task B according to the present embodiment is the road region dividing task for dividing an image (background) into regions and recognizing each of the divided regions to determine whether or not the region is a road. Here, in the recognition task B, an image is divided into square-block regions at constant intervals (for example, at 1-pixel intervals or 3-pixel intervals) and each region is recognized to determine whether or not the region is a road. That is, information indicating correct answer labels of respective regions is included as correct answer data in the evaluation data 110.

The setting unit 111 sets parameters (integration parameters) for integrating weights corresponding to the shared part of the recognition models based on the evaluation result of the recognition accuracy of the recognition model 103 output from the evaluating unit 104 and the evaluation result of the recognition accuracy of the recognition model 108 output from the evaluating unit 109. Then, the integrating unit 112 integrates the recognition models based on the set parameters. Although the integration parameters will be described later in detail, the integration parameters are, for example, integration rates to be used to integrate the models (weights to be used in weighted averaging).

Next, integration processing performed by the integrating unit 112 will be described with reference to FIG. 3. FIG. 3 is a block diagram showing an example of a detailed functional configuration of the integrating unit 112 according to the present embodiment. The integrating unit 112 includes a set generating unit 301 and a determination unit 302.

The set generating unit 301 generates a list of sets each constituted by a plurality of elements that are recognition models to be integrated. In the present embodiment, a set that is constituted by elements a, b, and c is denoted by {a, b, c}. Also, a list of such sets is denoted by [{a}, {a, b}, {c}], for example. Here, when N recognition models are to be integrated, the set generating unit 301 may be configured to generate a list of sets including 2, 3, . . . , or N elements and corresponding to all combinations of the recognition models. Hereinafter, such a set of recognition models may also be simply referred to as a "set".

Figure 4:
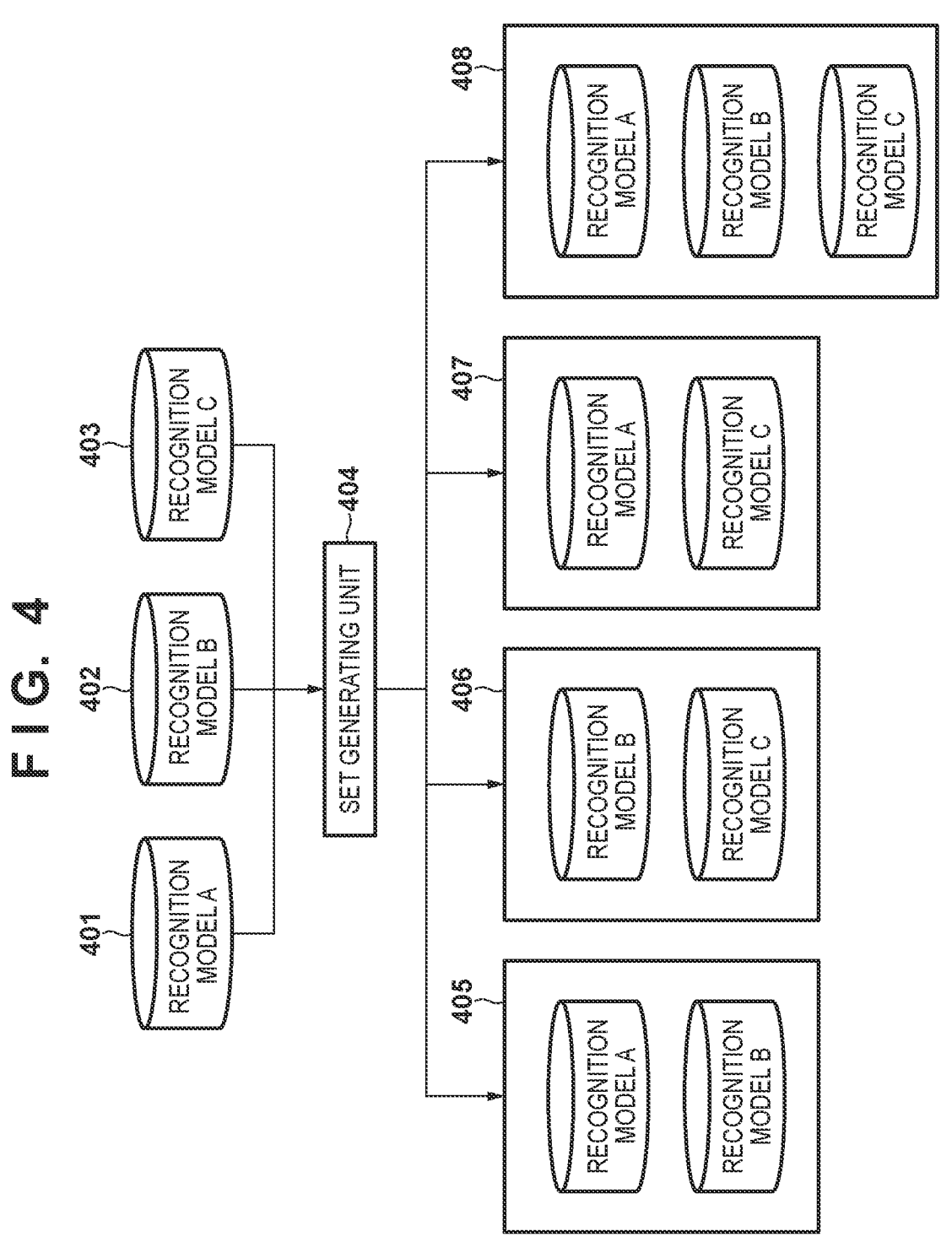
FIG. 4 is a diagram showing processing for generating sets of recognition models according to the first embodiment.

FIG. 4 is a schematic diagram showing generation of sets, which are combinations of recognition models, by the set generating unit 301 (404) according to the present embodiment. First, the set generating unit 404 outputs combinations of recognition models, which include two elements, with respect to three recognition models A 401, B 402, and C 403. In the example shown in FIG. 4, the set generating unit 404 generates a set 405 {recognition model A, recognition model B}, a set 406 {recognition model B, recognition model C}, and a set 407 {recognition model A, recognition model C}. Next, the set generating unit 404 outputs combinations of recognition models, which include three elements. In the example shown in FIG. 4, the set generating unit 404 generates a set 408 {recognition model A, recognition model B, recognition model C}.

Figures 5, 6:
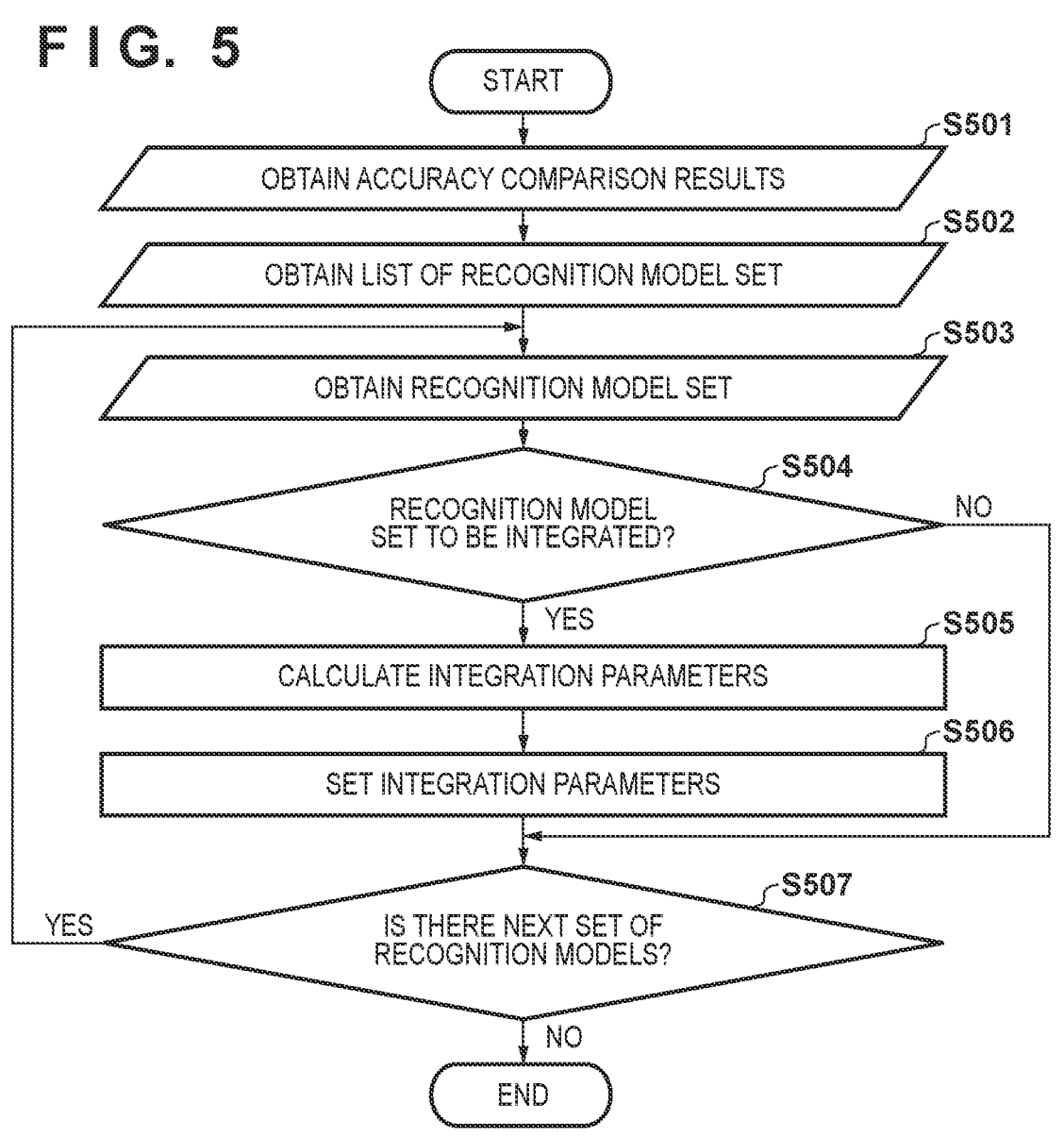
FIG. 5 is a flowchart showing an example of integration parameter setting processing according to the first embodiment.
FIG. 6 is a table showing an example of parameters determined in accordance with evaluation results of recognition accuracy according to the first embodiment.

Next, integration parameter setting processing performed by the determination unit 302 will be described with reference to FIG. 5. FIG. 5 is a flowchart showing an example of processing for setting integration parameters of recognition models, which is performed by the determination unit 302.

In step S501, the setting unit 111 obtains results of comparison of the recognition accuracy performed by the evaluating unit 104 with respect to each recognition model. In step S502, the determination unit 302 obtains the list of sets of recognition models generated by the set generating unit 301. In the example shown in FIG. 1, the obtained list of sets of recognition models includes only {recognition model A, recognition model B}.

Steps S503 to S507 correspond to loop processing in which integration parameters are calculated for each set of recognition models included in the list. In step S503, the determination unit 302 obtains a set of recognition models as a processing target from the list of sets of recognition models. In step S504, the determination unit 302 determines whether or not the set obtained as the processing target in step S503 is the target for which integration parameters are to be set. If the obtained set is the target for which integration parameters are to be set, the processing proceeds to step S505, otherwise the processing proceeds to step S507.

In the present embodiment, whether or not to set integration parameters is determined in advance with respect to each set of recognition models, but a configuration is also possible in which sets for which integration parameters are to be set are determined based on predetermined conditions. For example, the determination unit 302 may also determine sets for which integration parameters are to be set, based on an integration schedule, for example, depending on whether the integration is performed for an odd-number-th time or an even-number-th time. For example, integration parameters may be set for {recognition model A, recognition model B} and {recognition model A, recognition model C} when the integration is performed for an odd-number-th time. Also, integration parameters may be set for {recognition model B, recognition model C} and {recognition model A, recognition model B, recognition model C}, for example, when the integration is performed for an even-number-th time.

Here, the integration parameters are parameters for integrating weights corresponding to the shared part of the respective recognition models. That is, the integrating unit 112 according to the present embodiment integrates a weight corresponding to the shared part of the recognition model A and a weight corresponding to the shared part of the recognition model B using integration rates determined by the determination unit 302 to make the shared part shared by the recognition models. The integration parameters according to the present embodiment are, for example, integration rates at which the weights of the shared part of the recognition models are integrated, and the integration rates of the recognition tasks A and B are denoted by $\alpha_A$ and $\alpha_B$, respectively. In this case, if $\alpha_A$ is equal to $\alpha_B$, for example, the weight of the shared part after the recognition tasks A and B are integrated is the average of the weights corresponding to the shared part of the respective recognition models. When the integration rate of either one of the recognition models is increased, such as $\alpha_A > \alpha_B$, for example, the weight of the recognition model integrated at the higher rate contributes to the integrated weight of the shared part more than the weight of the other recognition model.

In step S505, the determination unit 302 sets integration parameters using the results of comparison of the recognition accuracy obtained in step S501. The determination unit 302 according to the present embodiment may also be configured to set the integration parameter of each recognition model by correcting an integration rate used in the last integration, in accordance with the value of the result of comparison. For example, the determination unit 302 may refer to the result of comparison and correct the integration rate used in the last integration by reducing the integration rate if the recognition accuracy has reached the target accuracy, and maintaining or increasing the integration rate if the recognition accuracy has not reached the target accuracy. Here, a configuration is also possible in which the determination unit 302 records the recognition accuracy at the time of the last integration, and in the case where the recognition accuracy has not reached the target accuracy, maintains the integration rate if the recognition accuracy is improved compared with that at the time of the last integration (before the current integration), and increases the integration rate if the recognition accuracy is equal to or lower than that at the time of the last integration. Note that if the integration rate is lower than a predetermined threshold (for example, 1.0), the integration rate may be rounded off to the threshold.

There is no particular limitation on the method for correcting the integration rates so long as the results of comparison of the recognition accuracy are reflected, and the integration rates may also be corrected by amounts determined in advance in accordance with a difference between the recognition accuracy and the target accuracy, for example.

FIG. 6 is a diagram showing an example of correspondence between multiplying factors used by the determination unit 302 according to the present embodiment to correct the integration rates of the respective recognition models in accordance with evaluation values ($\Delta$) that are differences between the recognition accuracy and the target accuracy. The table shown in FIG. 6 shows multiplying factors to be multiplied with integration rates used in the last integration in accordance with the value of $\Delta$, and when the recognition accuracy is higher than the target ($\Delta > 0$), the multiplying factors less than 1 are used to reduce the integration rates compared with those used in the last integration. When the recognition accuracy is lower than the target ($\Delta < 0$), the multiplying factors are set in accordance with the value of $\Delta$ in such a manner as to increase the integration rates. By increasing the integration rate of a recognition model whose recognition accuracy is low as described above, it is possible to gradually increase a reflected rate of the result of learning of a new task for which learning has progressed to some extent.

In this example, if the value of A is smaller than a threshold ($\Delta < -50$), it is considered that learning of the recognition model has hardly progressed and increasing its integration rate at this stage will have an adverse effect on the integration, and the multiplying factor is set to be less than 1. In this manner, it is possible to reduce the integration rate if the evaluation value is less than a predetermined threshold.

The determination unit 302 may also estimate the integration rate by learning the integration rate through reinforcement learning, and this example will be described later in Application Example 3. The determination unit 302 may also present the result of comparison of the recognition accuracy to the user and use an integration rate that is input by the user after the result of comparison is presented, and this example will be described later in Application Example 4.

In step S506, the determination unit 302 sets the integration rates calculated in step S505 for the set obtained as the processing target in step S503. In step S507, the determination unit 302 determines whether or not there is a set for which the processing has not been performed. If there is a set for which the processing has not been performed, the processing returns to step S503, otherwise the processing ends. Through the processing described above, integration parameters that are necessary for integration are set for each set of recognition models.

The integrating unit 112 integrates the weights corresponding to the shared part of the recognition models using the integration parameters set by the setting unit 111, and outputs an integrated weight. In the present embodiment, the integrated weight $W_{reduce}$ of the shared part is calculated by, for example, using the following formula (1) where $W_A$ and $W_B$ represent the weights corresponding to the shared part of the recognition models A and B, respectively.

$$W_{reduce} = (\alpha_A \lambda W_A + \alpha_B \times W_B) \div (\alpha_A + \alpha_B) \qquad \text{Formula (1)}$$

The integrating unit 112 may also record previously integrated weights corresponding to the shared part of the respective recognition models and correct the weights to be integrated, by using the recorded weights. For example, the weight $W_A$ of the recognition model A to be integrated may be corrected using a weight ($W_A^{best}$) corresponding to the shared part at a point in time when the recognition accuracy was the highest in a (predetermined) past period, and the corrected weight $W_A'$ may be integrated. This processing makes it possible to improve the recognition accuracy of a recognition task that has not reached the target accuracy while integrating recognition models and maintaining the recognition accuracy reflected from a recognition model that has already reached the target accuracy.

For example, $W_{reduce}$ may also be calculated using $W_A^{best}$ described above and the following formulas (2). Here, $\beta$ is a parameter that can be set by the user within the range of $0 \leq \beta \leq 1$ in accordance with a desired reflected rate.

$$W_A' = (1 - \beta) \times W_A + \beta \times W_A^{best}$$

$$W_A' = (1 - \beta) \times W_A + \beta \times W_A^{best}$$

$$W_{reduce} = (\alpha_A \times W_A' + \alpha_B \times W_B) \div (\alpha_A + \alpha_B)$$

Formulas (2)

After the weights corresponding to the shared part are integrated, each recognition model may also correct the weight corresponding to the shared part. For example, weights $W_{A,reduce}$ and $W_{B,reduce}$ corresponding to the shared part corrected by the recognition models A and B, respectively, may also be calculated by correcting the weight reduce of W the shared part shared by the recognition models, in accordance with the following formulas (3). The corrected weights may also be integrated as weights corresponding to the shared part. Here, the weight corresponding to the shared part of the recognition model B at a point in time when the recognition accuracy was the highest in a past period is denoted by $W_B^{best}$. $\gamma$ and $\delta$ are parameters that can be set by the user within the range of 0 or more and 1 or less in accordance with desired reflected rates.

$$W_{A,reduce} = (1-\gamma) \times W_{reduce} + \gamma\lambda W_A^{best}$$

$$W_{A,reduce} = (1-\gamma) \times W_{reduce} + \gamma \times W_A^{best}$$

$$W_{B,reduce} = (1-\delta) \times W_{reduce} + \delta \times W_B^{best} \qquad \text{Formulas (3)}$$

The updating unit 113 updates the weights corresponding to the shared layer (shared layer) of the respective recognition models to the integrated weight of the shared layer (shared layer) of the recognition models calculated by the integrating unit 112. Here, the updating unit 113 updates the weight corresponding to the shared part of each recognition model to $W_{reduce}$.

Before each recognition model is updated by the updating unit 113, the evaluating unit 104 may also determine whether or not the recognition accuracy of the recognition model will be degraded (compared with that before integration) when the weight corresponding to the shared part is updated, and if it is determined that the recognition accuracy will be degraded, the weight may be kept from being updated. For example, a configuration is also possible in which updating is not executed if the recognition accuracy of the recognition task A that has already reached the target accuracy becomes lower than the target accuracy (or the recognition accuracy is degraded) and the recognition accuracy of the recognition task B that has not reached the target accuracy is degraded as a result of updating. Whether or not to execute updating may be determined for each recognition model whose recognition accuracy is degraded, or it may also be determined not to execute updating for all the recognition models if the recognition accuracy is degraded for all the recognition models. This configuration makes it possible to avoid updating that degrades the recognition accuracy.

According to the configurations described above, it is possible to integrate weights corresponding to the shared part of the plurality of recognition models in such a manner that the identification accuracy of recognition tasks to be integrated through distributed learning improves as far as possible.

In the present embodiment, it is possible to carry out distributed learning of a multitask identification model including a plurality of different recognition tasks as described above. In the case where distributed learning of multiple tasks is carried out, if a recognition task for which learning has sufficiently progressed and a recognition task that is newly added are integrated by simply averaging weights of the respective tasks, the identification accuracy of the learned task may be degraded. Even when identification models having multiple tasks are integrated, if the identification accuracy of each identification model is evaluated and the identification models are integrated using parameters that are based on results of the evaluation as in the present embodiment, it is possible to integrate the models while maintaining the identification accuracy before integration as far as possible.

Note that desired tasks may be used as the recognition tasks in the present embodiment so long as the tasks involve recognition that is commonly performed using a recognition model. For example, it is possible to use, as the recognition tasks, a classification task for identifying an object in an image, an object detection task for detecting the location of an object, or a region dividing task for extracting a specific region. Also, it is possible to use, as the recognition tasks, a tracking task for tracking a subject, a motion recognition task for identifying motions of a subject, an organ detection task for detecting an organ, such as the face, of a subject, a posture estimation task for estimating a posture of a subject, or a depth estimation task for estimating the depth of an object.

Application Example 1

In the first embodiment, the recognition accuracy after the weight is updated is evaluated for each recognition model using the target accuracy of the recognition model for which distributed learning is carried out. The method for evaluating the recognition accuracy after the weight is updated is not limited to the example described above, and the evaluating unit 104 may also store previous recognition accuracy before the current updating of the weight, and evaluate the recognition accuracy after the updating of the weight relative to the previous recognition accuracy, for example. This configuration makes it possible to carry out learning with respect to an added recognition task while maintaining the accuracy of a recognition model for which learning has been sufficiently carried out in the past. Note that the previous recognition accuracy referred to here may be the last recognition accuracy, recognition accuracy (for example, at a point in time when the accuracy was the highest) that is selected from a past history, or a value that is calculated from recognition accuracy in a predetermined period. For example, the evaluating unit 104 may calculate the average recognition accuracy in a predetermined period for each recognition model, and evaluate the recognition accuracy using the average value. In the following description, the recognition model A is a sufficiently learned recognition model, and the recognition model B is a recognition model (particularly, a new recognition model) for which learning prepared in advance has not sufficiently been performed.

FIG. 7 is a block diagram showing an example of a functional configuration of the evaluating unit 104 according to this application example. The evaluating unit 104 can perform processing that is essentially the same as that described with reference to FIG. 2. In each application example described below including this application example, the configuration of the information processing apparatus 1 and processing that can be performed by the information processing apparatus 1 are essentially the same as those described with reference to FIGS. 1 to 6, and therefore, overlapping descriptions will be omitted.

An accuracy calculating unit 701 calculates recognition accuracy similarly to the accuracy calculating unit 201. An accuracy holding unit 702 stores recognition accuracy calculated by the accuracy calculating unit 701 in the past. An accuracy comparing unit 703 evaluates the recognition accuracy calculated by the accuracy calculating unit 701 using the past recognition accuracy stored in the accuracy holding unit 702. For example, the accuracy comparing unit 703 can evaluate the recognition accuracy using the past recognition accuracy stored in the accuracy holding unit instead of the target accuracy obtained by the target obtaining unit 202, in processing similar to that performed by the accuracy comparing unit 203. Here, the accuracy comparing unit 703 may use, as the past recognition accuracy, recognition accuracy at a point in time when the recognition accuracy was the highest, or recognition accuracy at the time of the last integration.

The determination unit 302 can set integration parameters by performing processing similar to that described with reference to FIG. 5, except for the processing performed in steps S501 and S505. In step S501 of this application example, the accuracy comparing unit 703 obtains results of evaluation of the recognition accuracy.

In step S505 of this application example, the determination unit 302 calculates integration parameters using the results of evaluation of the recognition accuracy obtained in step S501. As a result of evaluation of the recognition accuracy of the recognition model A, if it is determined that the recognition accuracy is higher than or equal to the comparison target (in this example, the evaluation value is 95% or more (105% or less)), for example, the determination unit 302 may maintain or reduce the integration rate of the recognition model A. As a result of evaluation of the recognition accuracy of the recognition model A, if it is determined that the recognition accuracy is lower than the comparison target (in this example, the evaluation value is less than 95%), for example, the determination unit 302 may increase the integration rate of the recognition model A. The same applies to the recognition model B as well.

The integration rate can be increased or reduced through processing similar to that described with reference to FIG. 6, and therefore, a description thereof is omitted here. Note that, when a recognition task is newly added, the recognition accuracy of the task often improves in an initial stage of learning even if the integration rate of the task is low, and accordingly, the integration rate of the new task may be adjusted to be low to prevent degradation of the accuracy of another recognition task that has been already learned. According to the processing described above, it is possible to carry out learning of a multitask recognition model by performing learning of an added recognition task while maintaining, as far as possible, the recognition accuracy reflected from a recognition model for which learning has been sufficiently performed in the past.

Application Example 2

In the first embodiment, integration rates that are used to integrate weights corresponding to the shared part of the respective recognition models are determined as the integration parameters. However, it is also conceivable to use, as the integration parameters that indicate reflected rates used in integration, the number of repetitions of learning of each recognition model to be performed until integration is performed once, for example.

The determination unit 302 according to this application example determines the number of repetitions of learning instead of the integration rate of each recognition model, based on a result of comparison output from the accuracy comparing unit 203. The determination unit 302 may also be configured to set the integration parameter of each recognition model by correcting the number of repetitions of learning used in the last integration, in accordance with the value of the result of comparison. For example, the determination unit 302 may refer to the result of comparison and correct the number of repetitions used in the last integration by reducing the number of repetitions if the recognition accuracy has reached the target accuracy, and maintaining or increasing the number of repetitions if the recognition accuracy has not reached the target accuracy. Here, a configuration is also possible in which the determination unit 302 records the recognition accuracy at the time of the last integration, and in the case where the recognition accuracy has not reached the target accuracy, maintains the number of repetitions if the recognition accuracy is improved compared with that of the last integration, and increases the number of repetitions if the recognition accuracy is equal to or lower than that of the last integration. Processing for determining the integration parameters (the numbers of repetitions) based on results of comparison as described above can be performed in the same manner as in the case where the integration rates are used, and FIG. 8 shows a table that shows the numbers of repetitions corresponding to evaluation values.

In this application example, the integrating unit 112 integrates the recognition models by averaging the weights corresponding to the shared part as shown in formula (4) below, for example. However, it is also possible to perform calculation as that shown in formula (1), for example, change the numbers of repetitions of learning, and then calculate a weighted average of the weights. It is also possible to calculate the weight of the shared part through averaging processing as shown in formula (4), and thereafter correct the weight corresponding to the shared part in each recognition model as shown in formulas (3).

$$W_{reduce} = (W_A + W_B) \div 2$$

$$W_{reduce} = (W_A + W_B) \div 2 \qquad \text{Formula (4)}$$

According to the processing described above, it is possible to make a difference between the numbers of times of learning based on evaluation results of the recognition accuracy of the respective recognition models when integrating the shared part of the recognition models for which distributed learning is carried out. Therefore, it is possible to more appropriately set the numbers of times of learning in cases where the degree of difficulty of leaning differs for each recognition task and there is a large difference between the recognition tasks in the number of repetitions of learning required before learning sufficiently converges, for example.

Application Example 3

The determination unit 302 may also estimate integration rates by learning the integration rates through reinforcement learning. FIG. 9 is a block diagram showing an example of a functional configuration of the determination unit 302 according to this application example. In this application example, the determination unit 302 includes a learning unit 901 and an estimating unit 902.

The learning unit 901 includes an agent that is a learning model of reinforcement learning. Here, the agent observes the recognition accuracy of each recognition model at the current time as a state, and estimates integration rates (integration parameters) in accordance with the state. Also, the agent sets the integration rates, integrates weights corresponding to the shared part of the plurality of recognition models using the set integration rates, and repeatedly performs learning by trial at random while getting the accuracy obtained through evaluation of the integrated recognition model as a reward. A specific method of reinforcement learning that deals with a problem including a large number of states is described in V Mnih, et al, "Human-level control through deep reinforcement learning", Nature 518 (7540), 529-533, for example. By giving the processing performed in step S505 by the determination unit 302 as prior knowledge to the agent, it is possible to stabilize learning of the agent.

The estimating unit 902 estimates the integration rates by inputting the recognition accuracy of each recognition model to the agent learned in the learning unit 901. This configuration makes it possible to appropriately set integration rates through reinforcement learning and efficiently integrate weights of the shared layer (shared layer) of the plurality of recognition models.

Application Example 4

The determination unit 302 may also present results of comparison of the recognition accuracy to the user and use integration rates that are input by the user after the results are presented.

FIG. 10 is a block diagram showing an example of a functional configuration of the determination unit 302 according to this application example. In this application example, the determination unit 302 includes an accuracy display unit 1001 and a parameter input unit 1002. Also, FIG. 11 shows an example of a graphical user interface (GUI) that is displayed on a display (not shown) of the information processing apparatus 1 in this application example.

Figure 11:
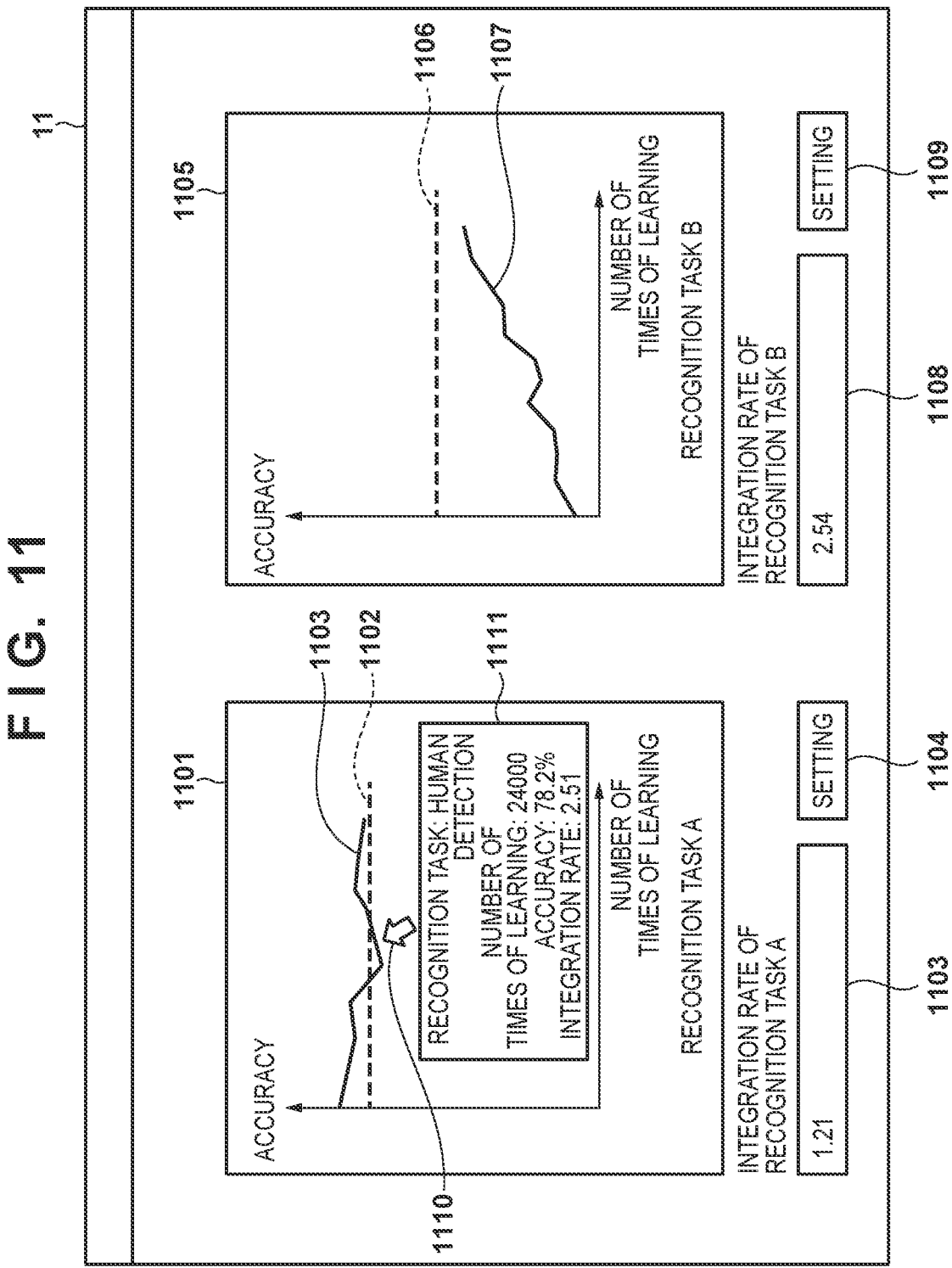
FIG. 11 is a schematic diagram showing an example of GUI presented to a user according to the first embodiment.

In FIG. 11, the accuracy display unit 1001 displays target accuracy 1102 of the recognition task A and accuracy 1103 of the recognition task A corresponding to the number of times of learning, in a display frame 1101 of a display screen 11. In the example shown in FIG. 11, the transition of the recognition accuracy in accordance with the number of times of learning is displayed as a graph, but there is no limitation to this configuration so long as similar information can be presented to the user, and such information may be presented by displaying a table, for example. In this application example, when the user inputs an integration rate to an integration rate input frame 1103 for the recognition task A and presses a setting button 1104, the set integration rate is reflected when the weights corresponding to the shared part are integrated for the next time. Also, recognition accuracy 1107 of the recognition task B corresponding to the number of times of learning is displayed in a display frame 1105, and an integration rate that is input to an integration rate input frame 1108 is reflected at the time of the next integration in response to a setting button 1109 being pressed by the user.

Note that when the user puts a mouse pointer 1110 in the display frame 1101 corresponding to the recognition task A on the display screen 11 shown in FIG. 11, a pop-up indication 1111 appears showing accuracy at the corresponding number of times of learning and an integration rate. Therefore, it is possible to adjust the current integration rate by referring to an integration rate set in the past.

The configuration described above enables the user to determine an integration rate as appropriate while checking the recognition accuracy. Therefore, the user can set integration parameters heuristically while checking learning conditions, and integration can be executed using the set parameters.

Second Embodiment

In the first embodiment, the single information processing apparatus 1 evaluates the recognition accuracy after updating with respect to each of the plurality of recognition models, and integrates weights corresponding to the shared part. However, the processing regarding the recognition models does not necessarily have to be performed by a single apparatus, and a configuration is also possible in which learning of the recognition models to be integrated is carried out by a plurality of apparatuses separately from each other, and the recognition models are finally integrated by the information processing apparatus 1. An information processing apparatus 12 according to the present embodiment is communicably connected to terminals A to Z that carry out learning of recognition models, respectively, and evaluates the recognition accuracy of each recognition model corresponding to the degree of progress of learning. In the following description, any one or more of the terminals A to Z will be simply referred to as a "terminal" or "terminals" when those terminals are not distinguished from each other.

FIG. 12 is a block diagram showing an example of a system configuration including the information processing apparatus 12 according to the present embodiment. The information processing apparatus 12 includes a communicating unit 1213, a collecting unit 1214, an evaluating unit 1215, a setting unit 1217, an integrating unit 1218, and an updating unit 1219, and is connected to the terminals A to Z by a wire or wirelessly. In the example shown in FIG. 12, the terminals are shown as terminals A 1201, B 1205, and Z 1209. The terminal A 1201 includes a recognition model 1204 and a learning unit 1203, the terminal B 1205 includes a recognition model 1208 and a learning unit 1207, and the terminal Z 1209 includes a recognition model 1212 and a learning unit 1211. Note that the terminals A to Z in the present embodiment respectively correspond to the recognition models A to Z including the recognition models A to C in the first embodiment, but there is no particular limitation on the number of terminals and recognition tasks to be learned.

The learning unit included in each terminal according to the present embodiment carries out learning of the recognition model using learning data by performing processing similar to that performed by the learning unit 102 in the first embodiment. Also, the learning units transmit weights corresponding to the shared part and updated through the learning to the communicating unit 1213 of the information processing apparatus 1. The communicating unit 1213 performs transmission and reception of recognition models or data such as information indicating conditions of progress of learning of the recognition models in the respective terminals between the information processing apparatus 12 and the terminals.

The collecting unit 1214 collects information regarding the recognition models from the terminals. In the present embodiment, the collecting unit 1214 obtains the recognition accuracy of the recognition models from the terminals, and the obtained recognition accuracy is compared with corresponding target accuracy (stored as evaluation data 1216 shown in FIG. 12) in the information processing apparatus 1. However, a configuration is also possible in which information indicating the target accuracy is held by each terminal, the recognition accuracy is compared with the target accuracy by the terminal, and the collecting unit 1214 collects results of comparison.

Here, the collecting unit 1214 may collect information regarding the recognition models after confirming that learning that is executed at predetermined intervals (which may differ for each terminal) has been completed in each terminal. In this case, after executing learning at predetermined intervals and transmitting the recognition accuracy to the information processing apparatus 1, each terminal suspends learning until the terminal receives a weight of the shared part to be used for updating from the updating unit 1219.

The evaluating unit 1215 evaluates the recognition accuracy of each recognition model collected by the collecting unit 1214. The evaluating unit 1215 according to the present embodiment can evaluate the recognition accuracy of each recognition model using the evaluation data 1216 in processing similar to that performed in the first embodiment, and output evaluation values.

The setting unit 1217, the integrating unit 1218, and the updating unit 1219 perform processing similar to that performed by the setting unit 111, the integrating unit 112, and the updating unit 113 in the first embodiment, and therefore, descriptions thereof are omitted here.

According to the configuration described above, it is possible to carry out learning of a plurality of recognition models in a distributed manner by using a plurality of terminals, and integrate the shared part while suppressing the occurrence of a situation in which it becomes difficult to carry out learning using a single apparatus due to a shortage of memory of the computer. Also, according to the configuration in which each terminal evaluates the recognition accuracy, the processing can be performed even when it is difficult to transmit some pieces of data between the information processing apparatus 12 and each terminal, or hold some pieces of data in the information processing apparatus 12 (from the viewpoint of protection of private information or confidential information, data capacity, or the like).

Third Embodiment

In the embodiments described above, for example, each processing unit shown in FIG. 1 or the like is implemented by dedicated hardware. Some or all of the processing units included in the information processing apparatus 1 may be implemented by a computer. In the present embodiment, at least some pieces of processing according to the embodiments described above are executed by the computer.

FIG. 13 is a diagram showing an essential configuration of the computer. In FIG. 13, a processor 1301 is a CPU, for example, and controls operations of the entire computer. A memory 1302 is a RAM, for example, and temporarily stores a program, data, and the like. A computer-readable storage medium 1303 is a hard disk, a CD-ROM, or the like, and stores a program, data, and the like for a long period. In the present embodiment, a program for implementing functions of the respective units, which is stored on the storage medium 1303, is loaded into the memory 1302. The processor 1301 operates in accordance with the program loaded into the memory 1302, and thus the functions of the respective units are implemented.

In FIG. 13, an input interface 1304 is an interface for obtaining information from external apparatuses. An output interface 1305 is an interface for outputting information to external apparatuses. A bus 1306 connects the units described above to enable data exchange between the units.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-041759 filed Mar. 16, 2022 and Japanese Patent Application No. 2023-030135 filed Feb. 28, 2023, which are hereby incorporated by reference herein in their entirety.

What is claimed is:

1. An information processing apparatus comprising:
   a processor; and
   a memory including instructions stored thereon, which when executed by the processor cause the information processing apparatus to:
   update a weight using corresponding learning data, with respect to each of a plurality of recognition models;
   evaluate recognition accuracy with respect to each of the recognition models;
   set parameters for integrating weights corresponding to a common layer of the recognition models based on results of evaluation of the recognition accuracy;
   integrate the weights corresponding to the common layer based on the parameters; and
   correct the weight corresponding to the common layer based on the recognition accuracy, with respect to each of the recognition models,
   wherein the plurality of recognition models are integrated in such a manner that the recognition models share the common layer, by integrating the weights corrected by the first correcting unit,
   wherein the weight is corrected corresponding to the common layer based on the highest recognition accuracy in a predetermined period, with respect to each of the recognition models, and
   wherein correcting the weight corresponding to the common layer comprises applying a correction defined by $W' = (1-\beta) \times W + \beta \times W_{best}$, where W is the weight corresponding to the common layer before correction, $W_{best}$ is a weight corresponding to the common layer at a point in time when the recognition accuracy was the highest in a predetermined period, and β is a coefficient predetermined for the correction.

2. The information processing apparatus according to claim 1, wherein each of the plurality of recognition models performs the same recognition task.

3. The information processing apparatus according to claim 1, wherein one of the plurality of recognition models performs a different recognition task from another recognition model of the plurality of recognition models.

4. The information processing apparatus according to claim 1, wherein the instructions, when executed by the processor further cause the information processing apparatus to:

to set a target for recognition accuracy of each of the recognition models, wherein the recognition accuracy is evaluated based on the target.

5. The information processing apparatus according to claim 4, wherein the instructions, when executed by the processor further cause the information processing apparatus to:

set the target as a predetermined value or sets the target based on recognition accuracy of the recognition model that has been evaluated before the weight is updated.

6. The information processing apparatus according to claim 1, wherein the parameters include an integration rate to be used to integrate the weights through weighted averaging.

7. The information processing apparatus according to claim 1, wherein the parameters include the number of repetitions of updating of the weight to be performed using learning data until integration is performed once.

8. The information processing apparatus according to claim 6, wherein the instructions, when executed by the processor further cause the information processing apparatus to:

increase the integration rate if the recognition accuracy is degraded compared with that before integration is performed, and maintains or reduces the integration rate if the recognition accuracy is improved compared with that before integration is performed.

9. The information processing apparatus according to claim 7, wherein the instructions, when executed by the processor further cause the information processing apparatus to:

increase the number of repetitions if the recognition accuracy is degraded compared with that before integration is performed, and maintains or reduces the number of repetitions if the recognition accuracy is improved compared with that before integration is performed.

10. The information processing apparatus according to claim 1, wherein the instructions, when executed by the processor further cause the information processing apparatus to:

present the recognition accuracy to a user; and set the parameters by obtaining the parameters that are input by the user.

11. The information processing apparatus according to claim 1, wherein the instructions, when executed by the processor further cause the information processing apparatus to:

generate a learned model that carries out reinforcement learning to estimate the parameters from the recognition accuracy; and set the parameters based on the learned model.

12. The information processing apparatus according to claim 1, wherein the instructions, when executed by the processor further cause the information processing apparatus to:

update the weight corresponding to the common layer of each of the plurality of recognition models by using the weight integrated.

13. The information processing apparatus according to claim 12, wherein the instructions, when executed by the processor further cause the information processing apparatus to:

determine whether or not the recognition accuracy of the recognition model is degraded as a result of updating of the weight, wherein the updating is not executed if it is determined that the recognition accuracy is degraded.

14. The information processing apparatus according to claim 12, wherein the instructions, when executed by the processor further cause the information processing apparatus to:

correct, with respect to each of the recognition models, the weight corresponding to the common layer and updated, based on the recognition accuracy of the recognition model.

15. The information processing apparatus according to claim 1, wherein the instructions, when executed by the processor further cause the information processing apparatus to:

set a set to which two or more of the recognition models belong; and integrate the recognition models belonging to the set.

16. The information processing apparatus according to claim 1, wherein the weight is updated with respect to each of the plurality of recognition models that respectively run on separate terminals.

17. The information processing apparatus according to claim 1, wherein the information processing apparatus performs a recognition task with respect to an image that is input, by using a recognition model into which the plurality of recognition models are integrated.

18. The information processing apparatus according to claim 1, wherein the recognition models perform one or more tasks out of a classification task for identifying an object in an image, an object detection task for detecting the location of an object, a region dividing task for extracting a specific region, a tracking task for tracking a subject, a motion recognition task for identifying motions of a subject, an organ detection task for detecting an organ, including: the face, of a subject, a posture estimation task for estimating a posture of a subject, and a depth estimation task for estimating the depth of an object.

19. An information processing method comprising:

updating a weight using corresponding learning data, with respect to each of a plurality of recognition models;

evaluating recognition accuracy with respect to each of the recognition models;

setting parameters for integrating weights corresponding to a common layer of the recognition models based on results of evaluation of the recognition accuracy;

integrating the weights corresponding to the common layer based on the parameters; and correcting the weight corresponding to the common layer based on the recognition accuracy, with respect to each of the recognition models, wherein the plurality of recognition models is integrated in such a manner that the recognition models share the common layer, by integrating the corrected weights, and wherein the weight corresponding to the common layer is corrected based on the highest recognition accuracy in a predetermined period, with respect to each of the recognition models, and wherein correcting the weight corresponding to the common layer comprises applying a correction defined by $W'=(1-\beta)\times W+\beta\times W_{best}$, where W is the weight corresponding to the common layer before correction, $W_{best}$ is a weight corresponding to the common layer at a point in time when the recognition accuracy was the highest in a predetermined period, and $\beta$ is a coefficient predetermined for the correction.

20. A non-transitory computer readable storage medium storing a program that, when executed by a computer, causes the computer to perform an information processing method comprising:

updating a weight using corresponding learning data, with respect to each of a plurality of recognition models;

evaluating recognition accuracy with respect to each of the recognition models;

setting parameters for integrating weights corresponding to a common layer of the recognition models based on results of evaluation of the recognition accuracy;

integrating the weights corresponding to the common layer based on the parameters; and correcting the weight corresponding to the common layer based on the recognition accuracy, with respect to each of the recognition models, wherein the plurality of recognition models is integrated in such a manner that the recognition models share the common layer, by integrating the corrected weights, wherein the weight corresponding to the common layer is corrected based on the highest recognition accuracy in a predetermined period, with respect to each of the recognition models, and wherein correcting the weight corresponding to the common layer comprises applying a correction defined by $W'=(1-\beta)\times W+\beta\times W_{best}$, where W is the weight corresponding to the common layer before correction, $W_{best}$ is a weight corresponding to the common layer at a point in time when the recognition accuracy was the highest in a predetermined period, and $\beta$ is a coefficient predetermined for the correction.

21. An integrated model comprising:

a recognition model comprising: a common layer; and one or more model-specific layers configured to perform recognition in cooperation with the common layer; and at least one other recognition model, wherein the recognition model and the at least one other recognition model are integrated such that the common layer is shared, wherein a weight corresponding to the common layer is an integrated weight obtained by integrating the weights corresponding to the common layer of each of the recognition models based on parameters set according to the recognition accuracy of each of the recognition models, and wherein the weight corresponding to the common layer of each of the recognition models is a corrected weight obtained by applying a correction defined by $W'=(1-\beta)\times W+\beta\times W_{best}$, where W is the weight corresponding to the common layer before correction, $W_{best}$ is a weight corresponding to the common layer at a point in time when the recognition accuracy was highest in a predetermined period, and $\beta$ is a coefficient predetermined for the correction.

* * * * *